United States Patent Office … 3,445,472 … Patented May 20, 1969

3,445,472
MONO- AND DI-AROYL PYRIDYLETHYL AND PIPERIDYLETHYL INDOLES
John L. Archibald, Malvern, Pa., assignor to American Home Products Corporation, New York, N.Y., a corporation of Delaware
No Drawing. Filed Dec. 3, 1965, Ser. No. 511,358
Int. Cl. C07d 57/00, 31/40, 29/34
U.S. Cl. 260—293.4          7 Claims

ABSTRACT OF THE DISCLOSURE

Mono- and di-aroyl pyridylethyl and piperidylethyl indoles, useful as analgesic and hypotensive agents.

---

This invention relates to new derivatives of indoles, and more particularly to mono- and di-aroyl pyridylethyl and piperidylethyl indoles, having pharmacological activity.

The novel compounds included within the scope of this invention are represented by the following formula:

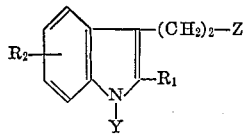

wherein $R_1$ and $R_2$ may be hydrogen, alkyl, alkoxy or halogen; Y may be acyl or aroyl, which last may be substituted by alkyl, alkoxy, or halogen; and Z may be pyridyl or piperidino, which last may be substituted on the N atom thereof by acyl, alkylsulfonyl, aroyl, arylsulfonyl, either of the latter two of which, in turn, may be substituted by alkyl, alkoxy or halogen; and the pharmaceutically-acceptable acid-addition salts thereof.

The novel compounds of the present invention coming within Formula I above, wherein Z is pyridyl, may be prepared generally by reacting the corresponding pyridylethyl indoles, which may be initially unsubstituted on the N atom of the indole moiety, with a molar equivalent of sodium hydride; followed by reaction with two molar equivalents of an acid chloride suitable for furnishing the desired acyl or aroyl moiety on said N atom. For obtaining those compounds encompassed by the invention wherein Z is piperidino, which is substituted on the N atom thereof by acyl, aroyl, alkylsulfonyl or arylsulfonyl; the corresponding N,N'-unsubstituted piperidylethyl indole is first reacted with one mole of an acid chloride suitable for furnishing the desired substituent on the N atom of the piperidino moiety; followed, in this instance, by reaction with sodium hydride; and then again with an acid chloride suitable, in this case, for furnishing the desired substituent on the N atom of the indole moiety.

Many of the reactants employed in the preparation of the compounds of this invention are known compounds which are readily available from commercial sources. Others which are not commercially available can be easily prepared in accordance with standard organic procedures well known to those skilled in the art.

It has been discovered that compounds meeting the described qualifications, whether as free bases or the acid-addition salts thereof, have useful pharmacological properties. More specifically, said compounds have been found to exhibit utility as analgesic and hypotensive agents.

As indicated hereinbefore, compounds within the general Formula I, above may be used in the form of their acid-addition salts, while still retaining their effectiveness with respect to analgesic and hypotensive activity. The salts may provide greater flexibility in therapeutic use since they may impart various degrees of water-solubility to an otherwise substantially insoluble base. With regard to the acid-addition salts, either organic or inorganic acids may be used for preparing them as long as said acids do not substantially increase the toxicity of the compounds. Among the various pharmaceutically-acceptable acid-addition salts of the bases of the invention, which are considered useful for the purpose indicated, are, for example, the hydrochlorides, sulphates, phosphates, hydrobromides, acetates, tartrates, propionates, sulphonates and the like, of said bases.

The acid-addition salts may be prepared by procedures now well known to those skilled in the art. For example, a selected novel free base may generally be dissolved in a suitable solvent and the selected acid may then be added thereto. Since the preparation of acid-addition salts is so well known, it need not be described in any greater detail here.

When the compounds of the invention are employed as analgesic and hypotensive agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing conventional excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 100 mg. per kg. of body weight per day, although as aforementioned variations will occur. However, a dosage level that is in the range of from about 0.5 mg. to about 20.0 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I 1-p-chlorobenzoyl-3-[2-(4-pyridyl)ethyl]indole

3-[2-(4-pyridyl)ethyl]indole (6.66 g.) was added to a stirred suspension of sodium hydride (1.5 g. of a 53% dispersion in mineral oil) in dimethylformamide (75 ml.). One hour later, p-chlorobenzoyl chloride (11.0 g.) was added slowly dropwise. Stirring was continued a further 2 hr., then the reaction mixture was added slowly to a solution of sodium bicarbonate (10 g.) in ice-water (500 ml.). The gummy precipitate was collected, triturated with ethanol and filtered to give p-chlorobenzoic anhydride (0.5 g.) M.P. 194–5°

$$\lambda^{KBr}_{max.}\ 5.68,\ 5.80\mu$$

The filtrate was evaporated and the residue was dissolved in chloroform. After shaking with 1 N HCl (×2) the product hydrochloride was found in the chloroform rather than the aqueous layer. Evaporation of the dried chloroform solution and crystallization of the residue from ethanol gave a crude hydrochloride which was reconverted to the free base and recrystallized from aqueous ethanol to provide the title compound as colorless needles, M.P. 94–5°

$\lambda_{max.}^{KBr}$ (C=O) 5.96μ

*Analysis.*—Calcd. for $C_{22}H_{17}ClN_2O$: C, 73.22; H, 4.75; N, 7.76; Cl, 9.83. Found: C, 73.44; H, 4.52; N, 7.65; Cl, 9.8.

EXAMPLE II 1-p-chlorobenzoyl-4-[2-(3-indolyl)ethyl]-piperidine

A solution of 4-[2-(3-indolyl)ethyl]-piperidine (2.28 g.) in dimethylformamide (25 ml.) was stirred and ice-cooled, while p-chlorobenzoyl chloride (1.80 g.) in dimethylformamide (5 ml.) was added dropwise. Stirring was continued for 2 hr., then the mixture was poured onto ice cold 0.1 N NaOH solution (200 ml.). The resulting gummy solid was collected and recrystallized twice from ethanol to give colorless needles of the title compound (2.22 g., 61%), M.P. 162–3°, $\lambda_{max.}^{KBr}$ (C=O) 6.20μ

*Analysis.*—Calcd. for $C_{22}H_{23}ClON_2$: C, 72.02; H, 6.31; N, 7.64; Cl, 9.67. Found: C, 71.73; H, 6.14; N, 7.74; Cl, 9.5.

EXAMPLE III 1-(p-chlorobenzoyl)-3-[2-(1-p-chlorobenzoyl-4-piperidyl)ethyl]-indole 1-p-chlorobenzoyl-4-[2-(3 - indolyl)ethyl] - piperidine (3.67 g.), obtained as in Example II, was added to a stirred suspension of sodium hydride (0.5 g. of a 53% dispersion in mineral oil) in dimethylformamide (25 ml.). One hour later, p-chlorobenzoyl chloride (1.80 g.) was added dropwise. Stirring was continued 1 hr., then the mixture was poured into ice-water. The resulting gummy solid was collected and crystallized from ethanol. Recrystallization from acetone-water provided the title compound as colorless needles, M.P. 166–7°, $\lambda_{max.}^{KBr}$ (C=O) 5.96, 6.14μ

*Analysis.*—Calcd. for $C_{29}H_{26}Cl_2O_2N_2$: C, 68.91; H, 5.19; H, 5.55; Cl, 14.03. Found: C, 69.14; H, 5.50; H, 5.30; Cl, 13.7.

EXAMPLE IV 1-p-chlorobenzoyl-2-[2-(3-indolyl)ethyl]-piperidine

2-[-(3-indolyl)ethyl]-piperidine was treated with p-chlorobenzoyl chloride in the same manner as in Example II. The title product was isolated as colorless needles, M.P. 145–6°, $\lambda_{max.}^{KBr}$ (C=O) 6.20μ

*Analysis.*—Calcd. for $C_{22}H_{23}ClON_2$: C, 72.02; H, 6.31; N, 7.64; Cl, 9.67. Found: C, 71.97; H, 6.47; N, 7.36; Cl, 9.65.

EXAMPLE V 1-acetyl-2-[2-(3-indolyl)ethyl]-piperidine

A mixture of 2-[2-(3-indolyl)ethyl]-piperidine (2.34 g.) in methylene chloride (100 ml.) and potassium bicarbonate (3.0 g.) in water (25 ml.) was stirred vigorously, while acetyl chloride (0.80 ml.) was added dropwise. After 15 min., the organic layer was separated, washed with 2 N HCl, dried and evaporated. The residual oil was crystallized then recrystallized from aqueous ethanol to give the title product (2.1 g.), M.P. 136–8°, $\lambda_{max.}^{KBr}$ (C=O) 6.22μ

*Analysis.*—Calcd. for $C_{17}H_{22}N_2O$: C, 75.52; H, 8.20; N, 10.36. Found: C, 75.03; H, 8.07; N, 10.61.

EXAMPLE VI

4-[2-(3-indolyl)ethyl]-1-p-tolylsulfonylpiperidine

4-[2-(3-indolyl)ethyl]-piperidine (1.0 g.) was treated with p-toluensulfonyl chloride (0.85 g.) in the same way as in Example V. After two recrystallizations from ethanol-water, the title product (1.2 g.) was obtained as pink leaflets, M.P. 131–2°.

*Analysis.*—Calcd. for $C_{22}H_{26}N_2O_2S$: C, 69.09; H, 6.85; N, 7.33; S, 8.37. Found: C, 69.04; H, 6.94; N, 7.07; S, 8.1.

EXAMPLE VII 5-methoxy-2-methyl-1-o-methoxybenzoyl-3-[2-(2-pyridyl)ethyl]indole 5-methoxy-2-methylindole is reacted with 2-vinylpyridine to give 5-methoxy-2-methyl-3-[2-(2-pyridyl)ethyl]indole, which is then converted to the title compound by reaction with sodium hydride and o-methoxybenzoyl chloride.

EXAMPLE VIII 5-bromo-1-m-chlorobenzoyl-3-[2-(1-p-chlorobenzoyl-4-piperidyl)ethyl]indole Starting with 5-bromo-3-[2-(4-piperidyl)ethyl]indole, the title compound is obtained by following the same general procedure as used for the preparation of the compound of Example III.

EXAMPLE IX 2-ethoxy-6-chloro-1-o-ethylbenzoyl-3-[2-(1-p-bromophensulfonyl-4-piperidyl)ethyl]indole Following the general procedure of Example III, 2-ethoxy-6-chloro-3[2-(4-piperidyl)ethyl]indole is reacted with 1-p-bromophensulfonyl chloride, and the product thereof is then converted to the title compound by reacting with sodium hydride and o-ethylbenzoyl chloride.

EXAMPLE X 2-chloro-7-bromo-1-p-ethoxyphensulfonyl-3-[2-(1-p-methoxyphensulfonyl-2-piperidyl)ethyl]indole Again following the general procedure of Example III, 2-chloro-7-bromo-3[2-(2-piperidyl)ethyl]indole is reacted with 1-p-methoxyphensulfonyl chloride, and the product thereof is then converted to the title compound by reaction with sodium hydride and p - ethoxyphensulfonyl chloride.

I claim:

1. A compound selected from the group consisting of those having the formula:

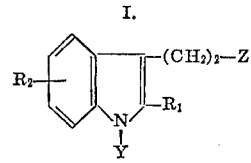

wherein $R_1$ and $R_2$ are selected from the group consisting of hydrogen, lower alkyl, lower alkoxy and halogen; Y is selected from the group consisting of lower alkanoyl, lower alkylbenzoyl, lower alkoxybenzoyl and halobenzoyl; and Z is selected from the group consisting of C-pyridyl, 1-(lower)-alkanoyl-C-piperidyl, 1-(benzoyl)-C-piperidyl, 1-(lower)-alkylbenzoyl - C - piperidyl, 1 - (loweralkoxybenzoyl) - C - piperidyl, 1 - (halobenzoyl) - C - piperidyl, 1-(phensulfonyl)-C-piperidyl, 1-(lower-alkylphensulfonyl)-C-piperidyl, 1-(loweralkoxyphensulfonyl)-C-piperidyl, 1-(halophensulfonyl)-C-piperidyl.

2. A compound as defined in claim 1 which is: 1-p-chlorobenzoyl-3-[2-(4-pyridyl) ethyl] indole.

3. A compound as defined in claim 1 which is: 1 - (p - chlorobenzoyl) - 3 - [2-(1-p-chlorobenzoyl-4-piperidyl) ethyl]-indole.

4. A compound as defined in claim 1 which is:

5-methoxy-2-methyl-1-o-methoxybenzoyl-3-[2-(2-pyridyl)ethyl]-indole.
5. A compound as defined in claim 1 which is:
5-bromo-1-m-chlorobenzoyl-3-[2-(1-p-chlorobenzoyl-4-piperidyl)-ethyl] indole.
6. A compound as defined in claim 1 which is:
2-ethoxy-6-chloro-1-o-ethylbenzoyl-3-[2-(1-p-bromophensulfonyl-4-piperidyl)ethyl] indole.
7. A compound as defined in claim 1 which is:
2-chloro-7-bromo-1-p-ethoxyphensulfonyl-3-[2-(1-p-methoxyphensulfonyl-2-piperidyl)ethyl] indole.

References Cited

UNITED STATES PATENTS 3,238,215  3/1966  Zenitz.

HENRY R. JILES, *Primary Examiner.*

R. T. BOND, *Assistant Examiner.*

U.S. Cl. X.R.

260—294.8, 294, 295, 999